__United States Patent Office__

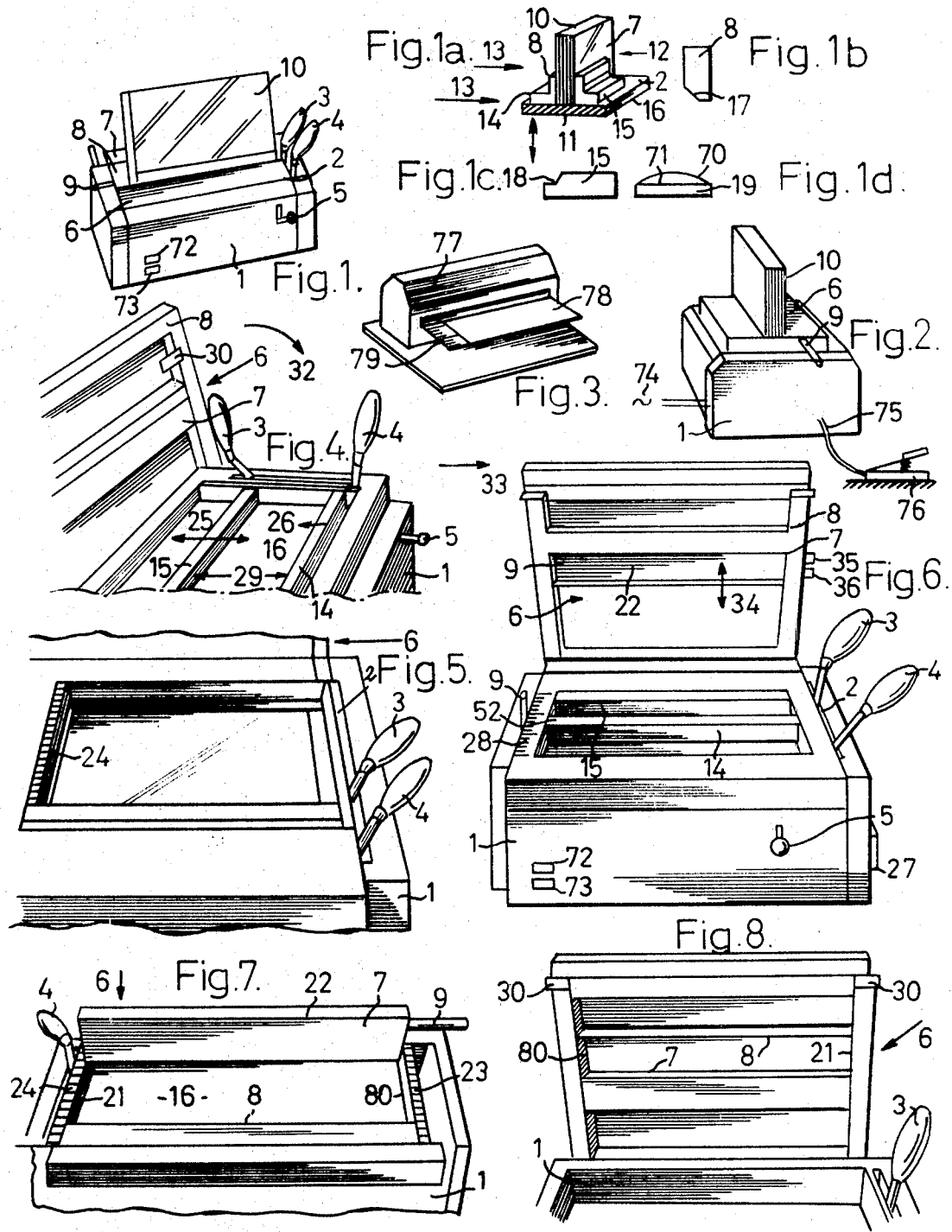

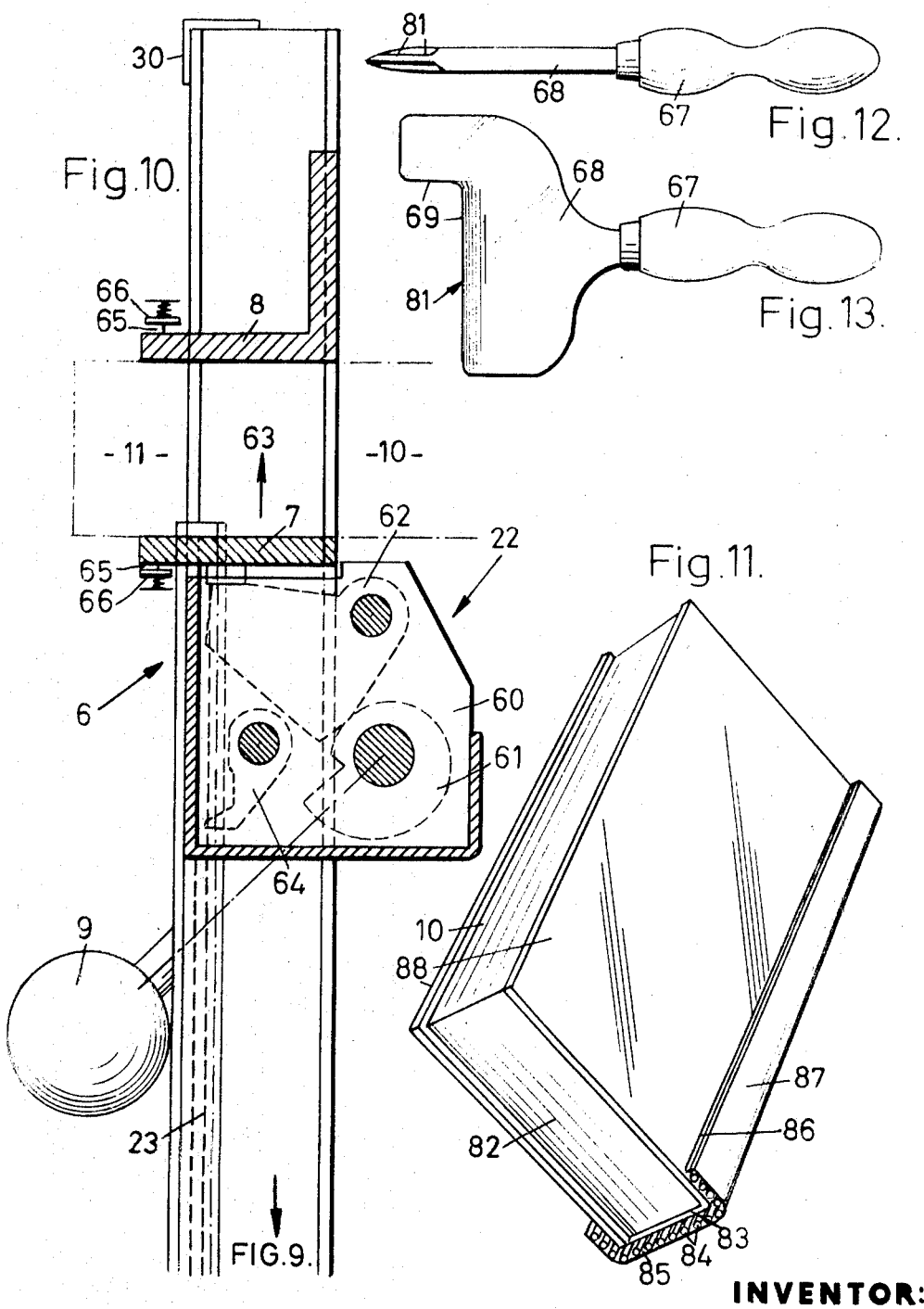

3,518,143
Patented June 30, 1970

---

3,518,143
METHOD OF WELDING WRITING MATERIALS, THERMOPLASTICS FOIL FOR WELDING THE WRITING MATERIALS AND APPARATUS FOR CARRYING OUT THE METHOD, EMPLOYING THE THERMOPLASTICS FOIL
Hans Führ, Aachener Strasse 90, Cologne, Germany
Filed Oct. 23, 1965, Ser. No. 502,881
Claims priority, application Germany, Oct. 24, 1964,
A 47,425
Int. Cl. B42c *13/00, 19/00*
U.S. Cl. 156—212   21 Claims

ABSTRACT OF THE DISCLOSURE

Method for welding together sheets of writing materials to be united on their end faces by a welding foil with synthetic plastic material, under the action of pressure and heat, so that a flexible binding is produced—a connecting foil for use in the welding method, having a mechanically resistant outer face and an inner face provided with a coating of plastic material—as well as an apparatus for carrying out the inventive welding method, and employing the connecting foil as aforementioned.

---

The invention relates to a method for welding sheets of writing materials, the latter being welded on an end face by a welding foil with a plastic binding, under the action of pressure and heat, so that a flexible binding results.

The invention also relates to a connecting foil for use in the method of welding sheets of writing materials according to the invention.

Furthermore, the invention relates to apparatus for carrying out the method of welding sheets of writing material according to the invention employing the connecting foil according to the invention.

Methods are already known for welding writing materials, wherein a thermoplastic synthetic foil is used which, under the action of pressure and heat, connects the end edges of the sheets which are to be welded together. These known methods are in the main used for welding together pads of paper formed by individual sheets taken from files and intended to be bound together in book form for filing in archives.

Also in the binding of books, it is known to join together the end faces of the sheets which are to be connected, by means of a welding foil, using pressure and heat.

It is the disadvantage of the known methods that various operations or stages in the method occur in separate items of apparatus so that a plant requires considerable space and skilled operation.

It is a further disadvantage of the known methods that a relatively long time is required to produce the flexible binding. With the known methods, the end edges of the individual sheets which are to be welded together have to be trimmed flat to provide a perfectly plane surface. Once this plane surface has been achieved, it must be clamped and then, elsewhere, be provided with adhesive so that, with the aid of further parts which secure the joint, the assembly can be glued under the action of pressure and heat. A certain drying time is then required before the process is concluded.

The invention aims to overcome these disadvantages of the known methods and apparatus for performing such methods, whereby, using a new synthetic foil, unskilled personnel binding a book block of up to 15 cm. thickness can in a minimum of time, i.e. approx. 9 minutes, impart a flexible binding to individual sheets of paper. With the new method, no special cutting machinery is required to produce a plane surface at the end edges, nor is any particular specialized knowledge required to bind the individual sheets into book form in a short time.

According to important novel features of the invention, there is provided a method of welding together sheets of writing materials, the latter being welded on an end face by a welding foil with synthetic plastics material, under the action of pressure and heat, so that a flexible binding is produced. In the inventive method, the writing material, in individual sheets, is first shaken on a shaking plate within a confined shaking chamber, after which two oppositely-disposed walls of the shaking chamber press the writing material together above the shaking plate, during the shaking operation, so that the end faces resting on the plate and intended to be welded are very slightly fanned open to favor the penetration of plastics material.

According to further features, a thermoplastic connecting foil having its lining facing outwardly, is placed about the fanned-open part of writing material sheets, the foil then penetrating under the action of heat and pressure into the end face and both outer faces of the sheets of material to be bound together and into the interior of the lining. When the welding time has expired, a pressing tool which cools the weld completes the welding operation.

By this means, the trimming of an entire book block is dispensed with because the end faces which are to be welded rest on a shaking plate and are in consequence shaken up and cleanly aligned to form a plane surface. By reason of the fanning open after the clamping or pressing together of the sheets, the sheets exhibit a certain capillary action and enhance the absorption or penetration of the plasticized binding material. Since the materials involved are made from thermoplastics material, only short times, e.g. 1 to 2 minutes, are required for the binding to be achieved. During the cooling, which can also occur outside of the clamping arrangement, cooling of the weld can be accelerated, upon completion of the pressure and heat application, by a satisfactory heat-conducting tool, e.g. a hand tool.

The method is expediently so conducted that the shaker plate is heated during the shaking process and pre-heats the fanned-open parts of the writing materials resting thereon and intended to be welded.

The fact that the shaker plate is simultaneously the heater plate can exclude any displacement of the planealigned end edges of the sheets. Said end edges are also pre-heated by the heated shaker plate so that liquefying welding foil made from synthetic thermoplastics material penetrates all the more easily and deeply.

It is also possible for the shaking operation to continue during the welding time.

This measure, too, assists rapid penetration of the softened and liquefied welding foil. Provision is continually made for ventilation, and the influence of mass during rapid shaking propels the liquid portions of the synthetic plastics into the sheets of writing materials.

Time is saved in welding in that the connecting foil, which is cut to the required size, is pre-heated by being laid on the lateral heater strips which, during the welding operation, are simultaneously pressure plates.

The connecting foil is a foil which, on the inside, has for instance a polyamide based foil, one side of which penetrates into the materials to be welded together while the other side, during the welding time, becomes connected to the inside of the lining. The pre-heating of this connecting foil consequently accelerates the welding.

With regard to the connecting foils, a preferred embodiment resides in that a polyethylene foil aged by ionizing treatment, e.g. ultra-violet or infrared radiation, is used for welding.

Tests have shown that such a foil produces a firmer binding than an ordinary foil in a short welding time.

Instead of ageing by ionizing treatment, it is also possible for polyethylene foil aged by chemical agents, e.g. ozone treatment, to be used for the welding.

It is also preferred for the outside of the lining foil to be mechanical resistant and/or decorative, whilst the inner side has for example a coating of synthetic plastics which, under the action of pressure and heat, becomes joined to the welding foil.

In order to prevent a lining foil becoming separated while the connecting foil is being applied, it is possible for the lining foil to be joined to the welding foil prior to the welding. Such a bond can be produced for instance mechanically, e.g. by form-closure or by the action of adhesion, e.g. by gluing or by the application of welding spots, so that the two parts forming the connecting foil are so connected with each other that, when applied prior to welding, they cannot become displaced.

In order to increase the mechanical resistance and, if need be, to accelerate the welding process, it is possible to arrange a readily heat-conductive foil, e.g. of metal lattice, between the lining and the welding foils.

This heat-conductive foil must be sufficiently thin to adapt itself to the carrier material. Metal gauze is therefore embedded directly in the plastics material and gives the spine of the book a substantially greater strength. It is possible for outwardly-protruding eyelets or suspension means, as would be necessary for an overhead-supported file system, to be arranged and simultaneously welded in with, for example, metal gauze.

Where a metal foil is used, this forms the lining foil; it may be directly in the welding zone or may be raised sufficiently far to form the book cover.

The invention also aims to provide apparatus for use in carrying out the method when using the connecting foil, in order to exploit the advantages of the method in an apparatus which occupies only a very small space, is cheap to produce, can be operated easily and adapted to all working conditions.

One preferred form of embodiment consists in the shaking heater plate being arranged in an under-frame accommodating the drive and the heating while the shaking-chamber walls and clamping jaws for the writing materials are arranged in a lid provided for the under-frame.

The fact that heating and clamping of the book block can be spatially separated by raising the lid offers in principle the possibility of the cooling and solidifying tool being passed over the book while the latter is cooling in the lid while, in the under-frame, the block is being heated, welded and shaken.

It is expedient for displaceable and lockable heating strips to be arranged directly over the heater and shaker plate, for welding the two outer sides of the sheets of writing material together under the action of pressure and heat.

By virtue of these displaceable heating strips, it is possible for the clamped book block which is pressed onto the heating plate, which is simultaneously a shaker plate, to be welded simultaneously from both sides as well as from one edge, under the action of pressure and heat. This simultaneous welding on three sides is important to ensure that the molten synthetic plastic foil penetrates to a sufficient depth into the end faces of the sheets.

It is preferred for a temperature controller and a time-switching contact to be incorporated in the circuit of the heating plates aid heating strips.

By these measures, it is possible to adapt the apparatus to the varying heat conductivity of different grades of paper and thicknesses of book.

The heating and/or shaking plate can also take different forms. One possibility resides in the heating plate being flat.

With this embodiment, the welding face is flat.

Further possibilities, where the heating plate is concave or convex, allow for the possibility of the sheets of paper being very slightly staggered in respect of one another, after the fashion of scales. This is, for example, the case where very thick sheets, which could be designated as cardboard, are to be bound together into a book, a relatively large welding face being obtained thereby.

Minimum structural expenditure is involved in the shaker plate being connected by curved leaf springs to the base plate at the four corners thereof and in the middle by an armature with an electromagnet attached to the base plate.

It is also possible for the shaker plate, in addition to an upward and downward movement, to perform a movement towards one side of the shaking chamber wall, by the armature being accordingly arranged.

By this measure, it is intended to ensure that, where various sizes of sheets are being joined, one side is flat, i.e. the side which then abuts one wall of the shaking chamber.

The shaker plate which, instead of the upward and downward movement, performs a circular or elliptical movement, serves this purpose.

Operation of the apparatus is facilitated by the heating strips being connected to handles by which they are displaceable parallel with the shaking plate/heating plate.

Of course, it is possible, instead of displacement of the heating strips by handles, also to provide independent, automatic displacement, e.g. by a magnetic or motorized drive.

It has furthermore been found expedient for one heating strip to travel only a small distance, while simultaneously actuating a timer with a contact, whilst the other heating strip travels a considerable distance, the gap between the two heating strips being indicated on a scale.

The heating strip which only travels a short distance serves to a certain extent as an abutment for one side of the book spine. The short path also facilitates the clamping and at the same time the actuation of the contact of a timer which then limits the welding time by opening of the contact. After movement by the handle, the other heating strip adapts itself to the different thicknesses of book spine.

In order to prevent the heating faces of the heating strips from adhering to the synthetic plastic, it is desirable that the heating faces of the heating strips, which serve at the same time as pressure faces, to be coated with polytetrafluoroethylene.

It is furthermore preferred for the heating members in the heating strips to be embedded in a U-shaped metal fitting. The purpose of this is to concentrate the heat given off by the heating elements on the heating faces.

For speedy and economical working, the feed of synthetic plastic foil may be from a supply roller arranged in the under-frame, the foil passing over a guillotine apparatus to the heating strips.

Once the book block is clamped in position, it is possible, by means of scales in the under-frame, to measure the width of the block, and the foil to be drawn off from the supply roll can be adapted to this width. In this case, therefore, the synthetic plastic foil is to a certain extent fed to the hot sides, namely in the under-frame and can thereby already be pre-heated if corresponding materials are used which nevertheless remain flat during pre-heating.

It is however also possible to have a separate container with the guillotine apparatus and a scale showing the length of the synthetic plastic foil, the scale agreeing with the scale measuring the distance between the heating strips.

The fact that the heating strips are applied prior to the welding, with the lowered lid in which the book block is clamped, means that the operator can read off the width of the book block on a scale and correspondingly draw a piece of foil from the container.

It is equally well possible and frequently more expedient for the synthetic plastic foil to be fed on the cold side, i.e. from the direction of the lid. This offers the advantage that the block which is to be welded is already available there and that the foil is drawn over the block and cut to size so that, when the lid is lowered, the synthetic foil is already applied against the end and outer sides of the book block in the manner desired for welding, which then ensues.

In order to achieve an adequate pressure of application of the end face of the book block on the heating plate, it is preferred for there to be in the under-frame a lever-releasable locking arrangement for the cover carrying the clamping apparatus.

The cover or lid, which is therefore lowered, clicks home into a locking apparatus; then, with pressure, the fanning-open of the sheets of writing material is encouraged and penetration of the molten welding foil facilitated.

Another important structural detail resides in the fact that guide slots may be provided in the under-frame for the handles of the heating strips and that warning lights for the operating condition and temperature may also be provided in the under-frame.

Furthermore, the feet of the under-frame may be vertically adjustable in order to achieve an inclined position of the under-frame. With this inclined position, it is possible also to encourage the sheets forming the book block to settle on one side.

The lid may have, on two opposite sides, strips of teeth parallel with each other, which serve for movement and arresting of a clamping device opposite to a fixed clamping jaw.

The fixed clamping jaw is disposed vertically above the fixed heating strip. The clamping apparatus provides for adaptation to all book block widths.

In order to generate adequate clamping force, it is preferred for the movable clamping apparatus to have coarse and fine adjustment facility as regards its distance from the fixed clamping jaw.

In accordance with invention, this adjustment is provided in that the coarse adjustment is provided by ratchet members engaging in the toothed racks permitting the clamping carriage considerable travel while the fine adjustment is achieved by a cam which moves the locking plate in the clamping carriage by a very slight amount.

The clamping apparatus is therefore formed by a clamping carriage and clamping plate. The clamping carriage is set according to the form of the book block and acts as a limiting wall of the shaking chamber on this side, opposite the clamping jaw. The actual clamping pressure is produced by moving an eccentric member which applies the clamping plate of the clamping carriage rigidly against the book block.

Operation is simplified in that the coarse adjustment is disengagable by locking keys being moved towards each other, whilst movement of the eccentric member is performed by a lever projecting from the under-frame. By means of this lever, it is possible by manual force to generate sufficiently great clamping force for capillary action to occur in the region of the weld, due to the closely pressed sheets.

For the shaking chamber walls, it is also preferred for a stop strip to be provided on one side of the lid, at right angles to the clamping jaws.

It is against this stop strip that one side of the book block is aligned, either when the table is tilted or when the apparatus is caused to shake towards this stop strip.

The walls of the shaking chamber are formed by the clamping jaws, the stop strip and the rail in the lid opposite the stop strip.

The distance between the oppositely disposed clamping jaws in this shaking chamber arrangement is adjustable.

When welding is completed, i.e. upon the welding time lapsing, the weld is cooled by means of a pressing tool in the form of a metal member with a handle, of which the working edges, adapted to the welding point, are at right angles to each other and are pointed.

When the lid which houses the as yet still clamped and welded block is raised, the delivery of heat to the welding point ceases. The still deformable weld is cooled by a heat-extracting tool which may be a hand tool. Instead of this hand tool, of course, any other kind of tool, possibly automatically operated, may be used.

Operation is simplified in that the circuit of the electromagnet for the shaker plate may include, for example, a foot switch which adjusts the amplitude of shake through, for instance, resistances. This foot switch serves therefore for switching the shaking process on and off and for adjusting the intensity.

During the shaking, the sheets are readily seen to become arranged so that a greater or less amplitude can be adjusted by means of the foot switch to accelerate the process.

Fixing of the foil prior to welding is achieved or simplified in that the stop edge of the heating strip has heat-insulating notches into which the connecting foil can be laid.

If the material is applied on the cold side, then it is preferred that the clamping jaws in the lid have notches or resilient mountings to which the connecting foil can be secured.

Further features of the invention will now be described with reference to the accompanying drawings, in which:

FIG. 1 is a general view of the apparatus according to the invention, with the lid lowered and showing the operating handles;

FIG. 1a shows in diagrammatic form the book block clamped between clamping plates and heating strips and resting on the heating/shaking plate;

FIG. 1b is a diagram showing the end of the left-hand clamping plate of FIG. 1a;

FIG. 1c is a diagram showing the end of the right-hand heating strip of FIG. 1a;

FIG. 1d shows possible configurations of heating plate, which may be flat, convex or concave;

FIG. 2 shows the apparatus with the lid lowered, the book block clamped in position and provided with a foot switch;

FIG. 3 is a diagram showing a container from which connecting foil can be taken;

FIG. 4 is a perspective view, partly cut-away, of the under-frame with the lid raised showing the operating handles and heating strips;

FIG. 5 is a view of the apparatus shown in FIG. 4, taken from a different direction;

FIG. 6 is a view of the apparatus shown in FIG. 5 with the lid raised;

FIG. 7 shows the lowered lid with no book block;

FIG. 8 shows the raised lid without book block;

FIG. 10 shows the raised lid of FIG. 9;

FIG. 11 shows the application of a connecting foil having a metal gauze inlay; and FIGS. 12 and 13 show a hand-operated pressing tool for cooling the welded sheets of writing material.

Figure 9:
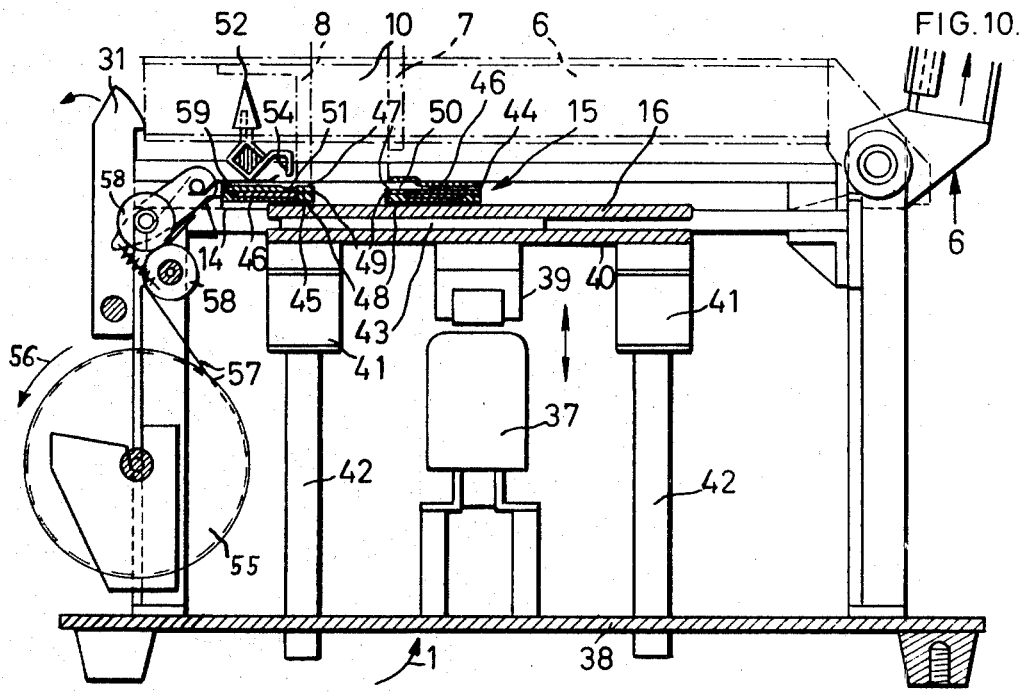
FIG. 9 shows, diagrammatically, a cross-section through the under-frame with the shaking mechanism and a foil dispensing and cutting apparatus, as well as bearings for the raised lid.

Referring to the drawings, and in particular to FIG. 1, the apparatus for performing the method according to the invention comprises an under-frame 1 which is provided with guide slots 2 for heating strips, to be described later, and with operating handles 3 and 4. A ratchet-held lid 6 is also provided and is releasable on operation of a lever 5. In the lid 6 are clamping jaws 7, 8, operated by a locking arm 9. Sheets 10 of written material, intended to be welded together on their end faces into a pad, block or book, are clamped in the lid 6 and are then immediately in the position for welding.

FIG. 1a shows diagrammatically that the fanned-open part 11 of the sheets 10 is below the clamping jaws 7, 8 which are lockable in the direction of arrows 12, 13, respectively. Heating strips 14, 15, concealed by the lid in FIG. 1, are arranged at a slight distance from a heating/shaking plate 16. When the sheets 10 are clamped in place by the clamping jaws 7, 8 in the direction of arrows 12, 13, the heating strips 15, 14 are applied, similarly in the same arrowed directions 12, 13, respectively, against the fanned-open part 11 of the sheets 10. The clamping jaws 7, 8 have at one end a chamfer 17 adapted to a recess 18 in the heater strips 14, 15, the purpose of this being to have heat applied immediately subsequent to clamping jaws 7, 8.

The heating/shaking plate 16 can have a concave surface 19 or a convex surface 70. However, as shown in FIG. 1d, it may have a plane surface 71.

A warning light 72 is shown in FIG. 1 which, when it comes on, indicates, for example, that the heating temperature has not been reached. A second warning light 73 serves as a means of verifying whether the apparatus is connected to a voltage source 74. In the circuit of an electromagnet 37 of the shaking table 16 are conductors 75 which lead to a foot switch 76 by which both the switching-on of the shaking plate 16 and also the amplitude of shake can be adjusted (see FIG. 2).

FIG. 3 illustrates a container 77 in which is housed a supply roller 55 of connecting foil 57 (see also FIG. 9). A piece of foil, pulled loose from the supply roller, can be cut off on a foil table 78 provided with a lateral scale 79, by means of a cutting device, not shown.

In FIGS. 4 to 8, the same reference numerals are used for the same component parts. FIG. 7 shows that the shaking chamber is bounded by the clamping jaws 7, 8 a stop strip or edge 80 and a rail 21 being arranged in the lid 6. A clamping device 22, described in greater detail hereinafter, is displaceable along toothed rails or racks 23, 24. FIGS. 4 and 6 show the heating strips 14, 15 arranged at a slight distance over the heating/shaking plate 16. Heating strip 15 is displaceable in the direction of arrow 25 by handle 3 while heating strip 14 is only to a small extent displaceable by the handle 4 in the direction of arrow 26. By reason of this movement in the direction of arrow 26, a diagrammatically indicated timer 27 (FIG. 6) is set in motion with its contact limiting the welding time.

Secured in the under-frame alongside the heating strip 15 is a scale 28 showing the distance 29 between the heating strips 14, 15. On each side, the lid 6 also has angled members 30 (FIG. 4) which engage under corresponding locking devices 31 (FIG. 9) when the lid is swivelled in the direction of arrow 32 onto the under-frame 1. The locking means 31 can be released by means of the lever 5 when the locking devices are moved in the direction of arrow 33. Exactly as the heating strip 15 can be moved in the direction of arrow 25, so the clamping apparatus 22 can be moved in the directions of arrow 34 if the locking keys 35, 36 are moved towards or away from each other.

In FIGS. 9 to 11, the same numbers denote the same parts. In FIG. 9, the electromagnet 37 for the shaking plate 16 is mounted on a base plate 38 of the under-frame 1. Armature 39 of the electromagnet 37 is connected to a plate 40. The corners of the plate 40 are also connected to the base plate 38 through struts 42, via rubber-mounted elements 41. Mounted on the plate 40 and heat-insulated underneath is a heating element 43 which is connected in readily heat-conductive manner to the heating and shaking plate 16. Heating strips 14, 15 are formed by U-shaped metal members 44, 45 which accommodate heating members 46, heat-insulated underneath. The heating elements are connected in readily heat-conductive manner to cover plates 47 while the actual heating face 48 is covered by a heat-resistant covering 49 to prevent the adhesion of the plastic synthetic foil on the heating faces 48. The heating strip 15 also has a notched portion 50 into which the connecting foil, cut to size, is inserted.

Provided in the other heating strip 14 is a recess 51 into which the other connecting foil, which is to be welded, is clamped when a pointer 52 shows the value of the heating strip 15 marked on the dial 28 (FIG. 6). Instead of being rigidly clamped, the foil 57 can also be cut to the desired size by operating a guillotine 54. The foil is fed by being unwound from the supply roll 55 which is removably disposed in the under-frame and which is revolved in the direction of arrow 56 when the connecting foil 57 is drawn off by feed rollers 58. The foil then passes through guides 59 between heating strips 14, 15. The mechanism described can be equally well arranged in the lid 6 and the notches 50 and recess 51 with the guillotine 54 are then correspondingly mounted on the clamping plates.

FIG. 10 shows the coarse and fine adjustment of the clamping apparatus 22 arranged in the lid 6. The clamping jaw 7 is displaceably attached on a clamping carriage 60. Movement of the clamping arm 9 turns an eccentric member 61. Through a thrust member 62, clamping plate 7 is then moved in the direction of arrow 63. By reason of the considerable travel of the clamping arm 9 and the resultant small amount of travel of the clamping jaw 7, a high pressure of application against the rigid clamping jaw 8 is achieved. Clamping device 22 is coarsely adjusted by raising latching members 64 by means of the locking keys 35, 36. As the latching members 64 are disengaged from rack 23, so clamping device 22 can be easily moved by hand.

With this embodiment, it is also possible, by means of notches 65 and resilient retaining elements 66, to apply the connecting foil 57 about the fanned-open part 11 of the sheets 10 prior to welding, i.e. in this case on the cold part.

As a tool to be used after welding and with the lid raised, FIGS. 12 and 13 show a metal member 68 mounted in a handle 67 and having edges 69 adapted to the welding point. The edges are provided with taperingly pointed surfaces 81.

FIG. 11 shows a binding with a particularly formed connecting or welding foil 83 obtained, for example, from the above-mentioned foil 57. The sheets 10 of material, of which one side 82 was formed during shaking by being jolted not only on the end face but also against the stop edge 80 (FIGS. 7 and 8), is backed with a connecting foil. The welding foil 83 is now in the position after welding, and becomes connected with a metal gauze 84 which so far rested on the inner face 85 of a lining foil 86. The outer face 87 of the lining foil may be decoratively formed. Metal foil 84 can be used in order to secure hooks or similar members protruding from the spine of the book and suitable for a suspension filing system. The sheets 10 of written material can also be surrounded by a strong outer cover 88.

According to the invention, it is possible to bind all types of combining sheets of paper, cardboard or the like quickly, even if the same are of different sizes, into the form of a pad or book in one apparatus with no cutting attachment. The method and the apparatus find application particularly where old files are to be broken up and the contents bound together in book form in order to use the files, with their more expensive mechanism, for further documents.

What I claim is:

1. A method of welding together a plurality of loose sheets of writing materials to be united on their end faces by a welding foil with synthetic plastic material, under the action of pressure and heat, so that a flexible binding is produced, comprising the steps of continuously shaking said sheets on a plate within a confined chamber so as to align said end faces of the sheets, pressing together said sheets by two oppositely disposed walls of said chamber above said plate and during said shaking step, slightly fanning open said end faces while they rest on said plate, to favor the penetration of plastic material, wherein said plate is heated during said shaking step and pre-heats those parts of said sheets which are fanned open and which are intended to be welded, and wherein a thermoplastic connecting foil, having its lining facing outwardly, is placed about the fanned-open end faces of said sheets, while still continuing said shaking step, said connecting foil then penetrating under the action of heat and pressure, during a predetermined welding time, into said end faces, both outer faces of said sheets and into the interior of said lining so as to weld said end faces, and cooling the weld with a tool when said welding time has expired.

2. The method as defined in claim 1, wherein said connecting foil is first cut to size and is then applied for pre-heating on lateral heating strips which, during said welding step, also act as pressure strips.

3. The method as defined in claim 1, further comprising the step of connecting a lining foil with said connecting foil before said welding step.

4. A multi-layer connecting foil for use in a method of welding together a plurality of loose sheets of writing materials to be united on their end faces by a welding foil with synthetic plastic material, under the action of pressure and heat, so that a flexible binding is produced, comprising a mechanically resistant outer face and an inner face provided with a coating of synthetic plastic material adapted to be united with said outer face and with said sheets under the action of pressure and heat.

5. The connecting foil as defined in claim 4, which consists of a synthetic plastic foil aged by irradiation treatment.

6. A connecting foil as defined in claim 4, which consists of a synthetic plastic foil aged by chemical treatment.

7. A connecting foil as defined in claim 4, further comprising a heat-conductive foil between said outer face and said inner face which faces said welding foil, adapted to be energized for heating by electricity for a predetermined heating period.

8. A connecting foil as defined in claim 4, which consists of a polyethylene-base synthetic plastic foil.

9. The connecting foil as defined in claim 4, which consists of a polyamide-base synthetic plastic foil.

10. An apparatus for welding together a plurality of loose sheets of writing materials to be united on their end faces by a welding foil with synthetic plastic material, under the action of pressure and heat, so that a flexible binding is produced, making use of a connecting foil, the apparatus comprising, in combination, an underframe, drive means and heating means in said underframe, a shaking chamber above said underframe, a shaking plate disposed between the walls of said shaking chamber, clamping jaws for said sheets to be united, and displaceable heating strips above said shaking plate for welding together the two outer sides of said sheets under said action of pressure and heat.

11. The apparatus as defined in claim 10, further comprising means for agitating said shaking plate, spring means interposed between said shaking plate and said agitating means, and means for adjusting the amplitude of the shaking.

12. The apparatus as defined in claim 11, wherein said agitating means includes a stationary base plate, said spring means is in the form of leaf spring interposed between said base plate and said shaking plate, an electromagnet being operatively interposed between said base plate and said shaking plate for agitating the same, and wherein said adjusting means acts on said electromagnet.

13. The apparatus as defined in claim 10, wherein there are at least two heating strips adapted to be displaced over different lengths, and further comprising first scale means for indicating the distance between said two heating strips.

14. An apparatus as defined in claim 10, wherein said heating strips have pressure and heat applying faces having a coat of polytetrafluoroethylene, and further comprising U-shaped metal fittings for lodging at least part of said heating strips.

15. The apparatus as defined in claim 10, further comprising tool means for pressing said sheets together and for dispersing heat accumulated therein, said tool means including engaging edges and handle means.

16. The apparatus as defined in claim 10, further comprising supply means for said connecting foil in said underframe, a cut-off device for said connecting foil between said supply means and said heating strips, said supply means being in the form of a container incorporating said cut-off device, and second scale means for indicating the length of cut-off connecting foil.

17. The apparatus as defined in claim 16, further comprising a lid for said underframe and carrying said clamping jaws, lock means for said lid, a stop rail on one side of said lid, and a second rail on the other side of said lid, said clamping jaws and said rails defining therebetween said shaking chamber.

18. An apparatus as defined in claim 16, further comprising a lid for said underframe, and toothed strips on opposite sides of said lid, one of said clamping jaws being movable while the other is fixed, means being provided for adjusting said movable clamping jaw with respect to said toothed strips.

19. An apparatus as defined in claim 18, wherein said adjusting means includes coarse and fine adjustment for the distance of said movable clamping jaw with respect to said fixed jaw, at least one ratchet member being provided in said coarse adjustment for co-operation with said toothed strips.

20. An apparatus as defined in claim 16, further comprising a lid for said underframe, said having mountings forming part of said clamping jaws, to which said connecting foil can be secured, said heating strips having notches for the guidance of said connecting foil.

21. The apparatus as defined in claim 20, further comprising additional clamping means for pressing said heating strips against the spine of said sheets, and timing means actuated while said lid is closed for operating said heating strips.

References Cited

UNITED STATES PATENTS

| | | |
|---|---|---|
| 855,322 | 5/1907 | Maccallum. |
| 2,366,572 | 1/1945 | Sutter. |
| 2,400,720 | 5/1946 | Staudinger et al. __ 161—411 XR |
| 2,579,488 | 12/1951 | Freeman. |
| 2,646,104 | 7/1953 | Hawkes. |
| 2,762,066 | 9/1956 | Meyer _____ 11—1 |
| 2,861,022 | 11/1958 | Lundsager _____ 161—214 |
| 2,935,418 | 5/1960 | Berthold et al. ____ 161—412 XR |
| 2,968,336 | 1/1961 | Martin et al. _____ 156—216 |
| 3,046,174 | 7/1962 | Brooks et al. ____ 161—214 XR |
| 3,146,473 | 9/1964 | Hoff _____ 11—1 |

JOHN T. GOOLKASIAN, Primary Examiner

G. W. MOXON II, Assistant Examiner

U.S. Cl. X.R.

281—21; 11—1; 156—216, 477, 214, 221, 222; 161—214, 411, 412